(12) United States Patent
Fowles

(10) Patent No.: US 8,579,264 B1
(45) Date of Patent: Nov. 12, 2013

(54) COMPUTER CONTROLLED WASTEWATER EVAPORATOR

(75) Inventor: Russell E. Fowles, Grand Junction, CO (US)

(73) Assignee: Aston Evaporative Service, Grand Junction, CO (US)

(*) Notice: Subject to any disclaimer, the term of this patent is extended or adjusted under 35 U.S.C. 154(b) by 346 days.

(21) Appl. No.: 13/165,204

(22) Filed: Jun. 21, 2011

(51) Int. Cl.
*B01F 3/04* (2006.01)

(52) U.S. Cl.
USPC ............................ 261/26; 261/78.2; 261/115

(58) Field of Classification Search
USPC .................. 261/78.2, 26, 115, 120, DIG. 79; 239/550
See application file for complete search history.

(56) References Cited

U.S. PATENT DOCUMENTS

| | | |
|---|---|---|
| 2,079,117 A | 9/1936 | Hayes |
| 3,610,527 A | 10/1971 | Ericson |
| 3,622,074 A | 11/1971 | Frohwerk |
| 3,669,422 A | 6/1972 | Nogaj |
| 3,785,558 A | 1/1974 | Albritton et al. |
| 3,998,389 A | 12/1976 | Rose et al. |
| 4,001,077 A | 1/1977 | Kemper |
| 4,409,107 A | 10/1983 | Busch |
| 4,449,849 A | 5/1984 | Horn et al. |
| 4,587,064 A | 5/1986 | Blum |
| 4,609,145 A | 9/1986 | Miller |
| 4,680,148 A | 7/1987 | Arbuisi et al. |
| 4,681,711 A | 7/1987 | Eaton |
| 4,713,172 A | 12/1987 | Horn et al. |
| 4,762,276 A | 8/1988 | Foust |
| 4,906,359 A | 3/1990 | Cox, Jr. |
| 5,004,531 A | 4/1991 | Tiernan |
| 5,032,230 A | 7/1991 | Shepard |
| 5,185,085 A | 2/1993 | Borgren |
| 5,227,067 A | 7/1993 | Runyon |
| 5,244,580 A | 9/1993 | Li |
| 5,381,742 A | 1/1995 | Linton et al. |
| 5,454,939 A | 10/1995 | Meuche |
| 5,499,490 A | 3/1996 | Minnich |
| 5,768,866 A | 6/1998 | Minnich |

(Continued)

FOREIGN PATENT DOCUMENTS

| | | |
|---|---|---|
| CN | 1820576 | 8/2006 |
| DE | 3425852 | 1/1986 |

(Continued)

OTHER PUBLICATIONS

M. K. Harris, Field Performance of Slimline Turbomist Evaporator under Southeastern U.S. Climate Conditions, Westinghouse Savannah River Company LLC, WSRC-RP-2003-00429, Revision 0, Oct. 2003.

(Continued)

*Primary Examiner* — Robert A Hopkins
(74) *Attorney, Agent, or Firm* — Patent Law Offices of Rick Martin, P.C.

(57) ABSTRACT

A pontoon based evaporative system has a weather monitoring station and control algorithm to shut down or slow down the atomizing fans in certain wind conditions. The central control system can control droplet size by slowing the fans down. The watercraft is collapsible to provide a fourteen foot width while afloat to support a plurality of atomizing fans high in the air. For transport the watercraft folds down to a nine foot trailer width with the atomizing fans resting on the base. An alternate embodiment is a land based frame having the same atomizing fans and weather monitoring and control algorithm.

25 Claims, 19 Drawing Sheets

(56) References Cited

U.S. PATENT DOCUMENTS

| | | | |
|---|---|---|---|
| 5,783,084 | A | 7/1998 | Suenkonis |
| 5,874,003 | A | 2/1999 | Rose |
| 5,971,372 | A | 10/1999 | Ash |
| 6,083,405 | A | 7/2000 | Tanaka et al. |
| 6,182,463 | B1 | 2/2001 | Strussion et al. |
| 6,190,498 | B1 | 2/2001 | Blagborne |
| 6,272,874 | B1 | 8/2001 | Keeney |
| 6,309,542 | B1 | 10/2001 | Kim |
| 6,325,362 | B1 | 12/2001 | Massey et al. |
| 6,348,147 | B1 | 2/2002 | Long |
| 6,367,278 | B1 | 4/2002 | Strussion et al. |
| 6,582,552 | B1 | 6/2003 | Juhola |
| 6,637,379 | B2 | 10/2003 | Hays et al. |
| 6,824,124 | B2 | 11/2004 | Henley |
| 6,875,351 | B2 | 4/2005 | Arnaud |
| 6,948,881 | B1 | 9/2005 | Fredriksson et al. |
| 7,022,242 | B2 | 4/2006 | Sacchi |
| 7,166,229 | B2 | 1/2007 | Cote et al. |
| 7,210,637 | B1 | 5/2007 | Johnson |
| 7,448,600 | B1 | 11/2008 | Boulter |
| 7,581,716 | B2 | 9/2009 | Tsai |
| 7,604,710 | B2 | 10/2009 | Haslem et al. |
| 8,256,748 | B1 | 9/2012 | Boulter |
| 2002/0079598 | A1 | 6/2002 | Kedem et al. |
| 2003/0062004 | A1 | 4/2003 | Hayes et al. |
| 2004/0045682 | A1 | 3/2004 | Liprie |
| 2004/0086816 | A1 | 5/2004 | Hayes et al. |
| 2006/0032797 | A1 | 2/2006 | Tsai |
| 2006/0162349 | A1 | 7/2006 | Edwards et al. |

FOREIGN PATENT DOCUMENTS

| | | |
|---|---|---|
| DE | 29805795 U1 | 10/1998 |
| DE | 298057950 | 10/1998 |
| ES | 2024097 | 6/1990 |
| ES | 2157798 | 8/2001 |
| GB | 190000085 | 4/1990 |
| JP | 55112987 | 9/1980 |
| JP | S55-112987 | 9/1980 |
| JP | 5317877 | 12/1993 |
| JP | H05-317877 | 12/1993 |
| JP | 7008987 | 1/1995 |
| JP | H07-008987 | 1/1995 |
| JP | H08-108196 | 4/1996 |
| JP | H08-8108197 | 4/1996 |
| JP | H08-8108198 | 4/1996 |
| JP | H08-8108199 | 4/1996 |
| JP | 8244679 | 9/1996 |
| JP | H08-244679 | 9/1996 |
| JP | 9253692 | 9/1997 |
| JP | H09-253692 | 9/1997 |
| JP | 2003-175394 | 6/2003 |
| JP | 2003175394 | 6/2003 |
| RU | 2128317 | 3/1999 |
| RU | 2168133 | 5/2001 |
| RU | 2215960 | 8/2003 |
| TW | 533087 B | 5/2003 |

OTHER PUBLICATIONS

USDA-ARS-Aerial Application Technology Group, NECE Farooq Collection Efficiency—Nov. 2009, U.S. Department of Agriculture, Agricultural Research Service, Nov. 23, 2009, contact Clint Hoffmann & Brad Fritz, USDA.

COMPUTER CONTROLLED WASTEWATER EVAPORATOR

FIELD OF INVENTION

The present invention relates to using a control computer to monitor wind, flow, location and other environmental data to control water droplet size and direction of the cloud from a raft having high speed atomizing fans which evaporates wastewater such as oil field production water mining wastewater, and energy by-product wastewater.

BACKGROUND OF THE INVENTION

Drilling, completion operations and production operations for oil and gas often creates millions of gallons of wastewater. This wastewater is often pumped into a reservoir. The wastewater must be removed for continuous operations or regulatory zero discharge requirements. Off-site disposal and trucking the wastewater is costly. Natural evaporation is slow and inefficient. What is needed is a cost efficient way to remove large quantities of wastewater with as minimal environmental impact as possible.

U.S. Pat. No. 4,449,849 (1984) to Horm et al. discloses oil drilling wastewater evaporator using a land based pump to spray via nozzles the water all around the edge of the reservoir back into the reservoir. A float can support a splashplate to increase the rate of evaporation from the land based nozzle.

U.S. Pat. No. 7,448,600 provides a floating device that supports over a dozen high speed atomizing fans. The floating device is tethered from the sides of the reservoir or anchored in the reservoir. Power (preferably hydraulic) is supplied from a land based power unit. Hydraulic fluid, once cycled for power to the fans and the water pump, is used to pre-heat the water, thereby adding efficiency to the entire system. This hydraulic fluid also is used to transport the land based engine cooling heat out to the unit. Another heat exchanger on the land based power unit removes the heat from the coolant and adds it to the oil coming back from the return lines before it goes to the storage tank. All the components can be mounted on a custom trailer to enable portability among several sites.

Problems with this system include the top heavy buoyancy of a raft confined to the width of a trailer. Another problem is the uncontrollable direction of the evaporative cloud which can contaminate nearby equipment. Also no droplet size control exists for varying humidity and wind conditions.

The present invention solves these and other problems with a collapsible raft that widens to a large stance in the water. A plurality of environmental sensors are monitored by a control computer and optionally this data can be transmitted in real time to a remote control headquarters.

SUMMARY OF THE INVENTION

The main aspect of the present invention is to provide an environmental monitoring and control system for a wastewater evaporator to direct or stop the evaporative cloud in changing wind conditions.

Another aspect of the present invention is to control the water droplet size.

Another aspect of the present invention is to provide a hydraulic fan and an electric fan embodiment.

Another aspect of the present invention is to provide a remote data collection and control capability for the wastewater evaporator.

Another aspect of the present invention is to provide a collapsible raft for the high speed evaporative fans that has a narrow width for a trailer and a wide width for flotation to support the high speed evaporative fans.

Another aspect of the present invention is to provide an adjustable fan angle support for the high speed evaporative fans.

Other aspects of this invention will appear from the following description and appended claims, reference being made to the accompanying drawings forming a part of this specification wherein like reference characters designate corresponding parts in the several views.

The improved wastewater evaporator is a raft based unit with multiple high speed evaporative fans. In the water the raft is fully deployed to a width of about fourteen feet. In the transport it collapses to a nine foot or less trailer width or container width. The support arms for the high speed evaporative fans fold down for transport to lower the heavy fans to the base of the evaporator.

In operation a programmable logic controller (PLC) collects data from a weather station and a water flowmeter. System operators, either at the raft site or remotely with optional telemetric gear, can monitor wind direction and shut the fans off to prevent the evaporative cloud from travelling over designated restricted zones. Droplet size can be adjusted by adjusting the fan speed along with total evaporation volume to control the amount of water to be atomized.

Feed Water Quality

All options provided are based on a feed water quality requiring evaporation to be equal to or less than 100,000 mg/L TDS. For sites where the feed water requiring treatment contains TDS>100,000 mg/L, equipment selection and budget costs are anticipated to be similar, but will require further confirmation.

Equipment Features & Benefits

Features of the preferred embodiment evaporation technology are as follows:

- Lowest overall operation costs in the market.
- Evaporation rates in excess of 80%.
- Able to withstand the harshest of environment, including low pH water.
- Ability to handle high TDS water, (i.e. >100,000 ppm TDS).
- Easy to setup with low maintenance costs.
- Meet zero liquid discharge criteria.
- Easily operated.
- Easily controlled with variable water flows, not just on and off operation.
- On board data acquisition, reporting functions and control by local weather conditions.

System Design

The present invention does not use high water pressures to create the atomization of the water and does not require the use of nozzles. This eliminates a great deal of auxiliary equipment operating and maintenance costs when compared to similar competitor evaporation equipment. Also, without nozzles there is no danger of the equipment requiring frequent shutdowns or loss of performance due to clogging. No other manufactures machines have this capability. The Atomizers don't rely on nozzle geometry or pressure to create spray, which is the unique advantage that provides superior evaporation performance, despite operation using abrasive, viscous, high TDS (>100,000 ppm) and corrosive (i.e. low pH) liquids.

The atomizer heads can be powered by hydraulics instead of electricity. In its standard configuration the present invention efficiently operates with abrasive, viscous, high TDS (>100,000 ppm) and corrosive liquids, without accelerated wear or clogging. The water outlets are stainless steel, UV stabilized, and chemical resistant, requiring little or no service for thousands of operating hours.

The atomizers expedite evaporation cycles by adding 10,000 CFM of air directly to water droplets of 75-115 microns. The amount of air required for optimal evaporation is critical. A high volume airflow that is highly turbulent to mix with and entrain surrounding air maximizes evaporation rates.

The exceptionally high >80% evaporation rates are achieved due to a number of unique factors.

- The perfect mixing of 10,000 cfm's turbulent air with every head.
- Average droplet size spectra between 75-115 microns against an average 350 microns found in competitors machines.
- Preheating the water using a heat exchanger that utilizes heat that is normally discharged to the atmosphere which no other unit does.

System Operation

The largest present model has 16-heads and will atomize from 1 to 96 gallons per minute (3.8 to 363H LPM).

The evaporation system does not need auxiliary pumps and services, which makes setup and moving the equipment if required a simple and quick task unlike any other equipment on the market. It also substantially reduces the whole of life operation cost. Typically it takes 5 to 10 machines of a similar energy input manufactured by other equipment suppliers to match the evaporation rate performance of one of our machines. This is a large saving to both the end user and the environment. With built in intelligent processing, the evaporation system monitors local weather conditions and provides the capability to either automatically or manually vary the equipments operating parameters to maintain optimum environmental and operating efficiencies in line with the changing local weather conditions. The unique features of the system include providing the user the ability to control the system via multiple parameters based on site specific environmental and climatic conditions:

- Wind speed/wind direction control.
- Flow meter and pond level sensors to measure and report production efficiencies.
- Access and reporting of live data and the facilitation of any necessary adjustments from a remote position.
- Messaging and email alerts for constant monitoring of all major equipment factions.
- The ability to download daily, weekly, and monthly reports, which may be important if you need to show compliance with a consent issued by the local environmental protection agency (i.e. EPA).

The standard power unit is a 140 hp tier 3 John Deere Industrial Diesel engine (104 KW) with the hydraulics using a vegetable oil rather than a petroleum based products for environmental protection. Alternatively, both natural gas and electricity engine options are also available instead of the standard diesel engine option.

Unique features employed on this unit include a heat exchange system utilizing system waste heat that raised the water temperature, waste water droplet average sizes between 75-115 micron spectra and mixing 10,000 cfm's of turbulent air with every head allow industry best evaporation rates.

System Inspection & Maintenance

If continuously in operation, the unit will require approximately monthly inspections to ensure efficient operation is maintained involving simple tasks such as the checking and cleaning of the pump inline filter unit. The filter is a Stainless screen filter so normally just needs to be washed clean using the evaporation pond water for cleaning.

An annual overhaul of the system is recommended as part of a preventative maintenance schedule to ensure the system achieves optimum evaporation performance.

Remote Monitoring

The control system offers advanced efficiency by including a complete weather station, with programmable set points that allow more flexible runtimes, data collection, and remote operation and monitoring.

Specifically set out with simple commands, the systems functionality enables high efficiencies to be maintained during all types of weather conditions under either manual or automatic control:

- Pond depth to monitor pond water level drop.
- Water flow meter to monitor daily, weekly, monthly water volume atomized.
- Onboard intelligence constantly monitors and runs the plant at the maximum efficiency for the prevailing conditions.
- High wind strength and adverse direction Shutdown/Slowdown alleviates overspray issues for sensitive areas.
- Telemetry provides the facility for remote operation including start up and shutdown.
- Humidity and Barometric pressure readings.
- GPS to access live data and download daily, weekly, and monthly reports.
- Completely programmable system to automatically match local conditions.
- Text message or email alert for constant monitoring while away from unit. No requirement for local operator and monitoring of unit operation.
- This information provided locally and remotely in real time provides the ability for unit to be controlled remotely.

Waste Disposal

The spray evaporator units evaporate >80% of the feed water flow, but the remaining 20% will require suitable disposal. It is recommended that the spray evaporation module is located and anchored on top of the water storage facility to minimize spray drift and ensure water which is not evaporated is returned to the local storage facility (i>e>evaporation pond).

Best Mode Specifications

Atomizing Heads: 16
Water Atomized: 80 gpm/302.8 Lmin
Water Outlets: 0.1875 in/4.8 mm
Atomizer Max Motor Speed: 5500 rpm
Atomizer Shroud Circumference: 18 in/457.2 mm
Engine: Tier 3 John Deere 4045HF285 140 HP turbo-charged diesel @2400 rpm
Engine Options Natural Gas; Electric
Fuel Capacity: 250 gallons/946 Liters
Fuel Consumption: 4.5 gph/17 Lhour @2400 rpm
Hydraulic Reservoir Capacity: 50 gallons/189 Liters
Return Box Reservoir Capacity: 6 gallons/23 Liters
Skid Height: 7 ft/2133 mm
Skid Length: 10 ft/3048 mm
Skid Width: 7 ft/2133 mm
Skid Operating Weight: 8800 lbs/3992 Kg
Skid Shipping Weight: 7900 lbs/3583 Kg
Atomizing Unit Height folded: 6 ft 4 in/1930 mm
Atomizing Unit Length folded: 24 ft 6 in/7468 mm
Atomizing Unit Width folded: 7 ft 6 in/2286 mm
Atomizing Unit Height unfolded: 9 ft 4 in/2835 mm
Atomizing Unit Length unfolded: 36 ft 2 in/11033 mm
Atomizing Unit Width unfolded: 16 ft 11 in/5157 mm
Atomizing Unit Shipping Weight: 4060 lbs/1842 Kg
Electronics Included VAISALA WT520 programmable Wind Speed/Direction inputs with auto-shutdown and programmable Temperature/Humidity inputs with auto-shutdown.

Blancett Flow Meter with per minute and 24-hour totals.

Dynotek Pond Water Level data collector.

All engine and hydraulic functions and levels have safety auto-shutdown features to protect components.

Access and Login information to SatAlarm website to track all information remotely using windows capable computers.

Figure 1:
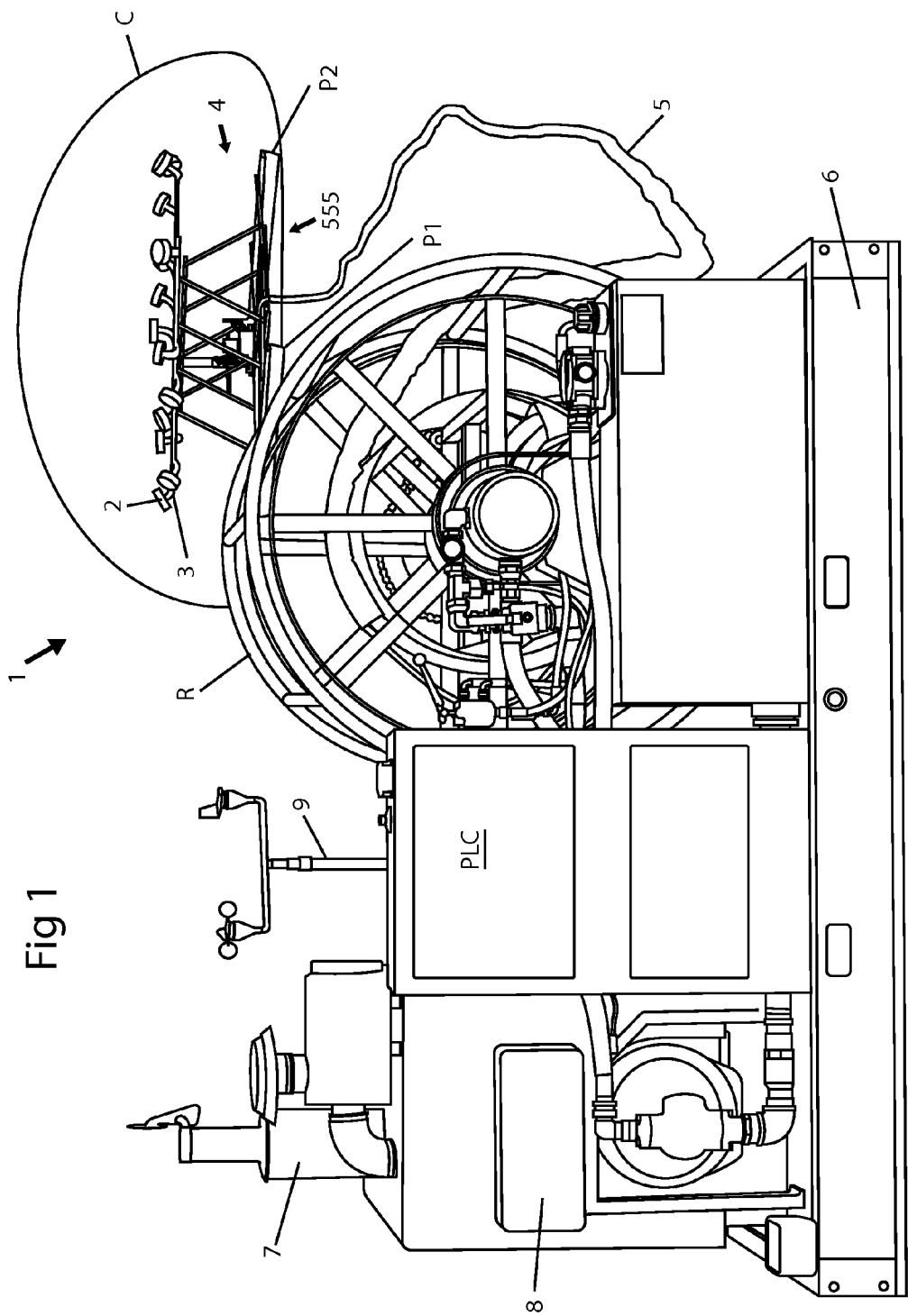
FIG. 1 is a front perspective view of the diesel/hydraulic power plant and the remote watercraft.
Figure 2:
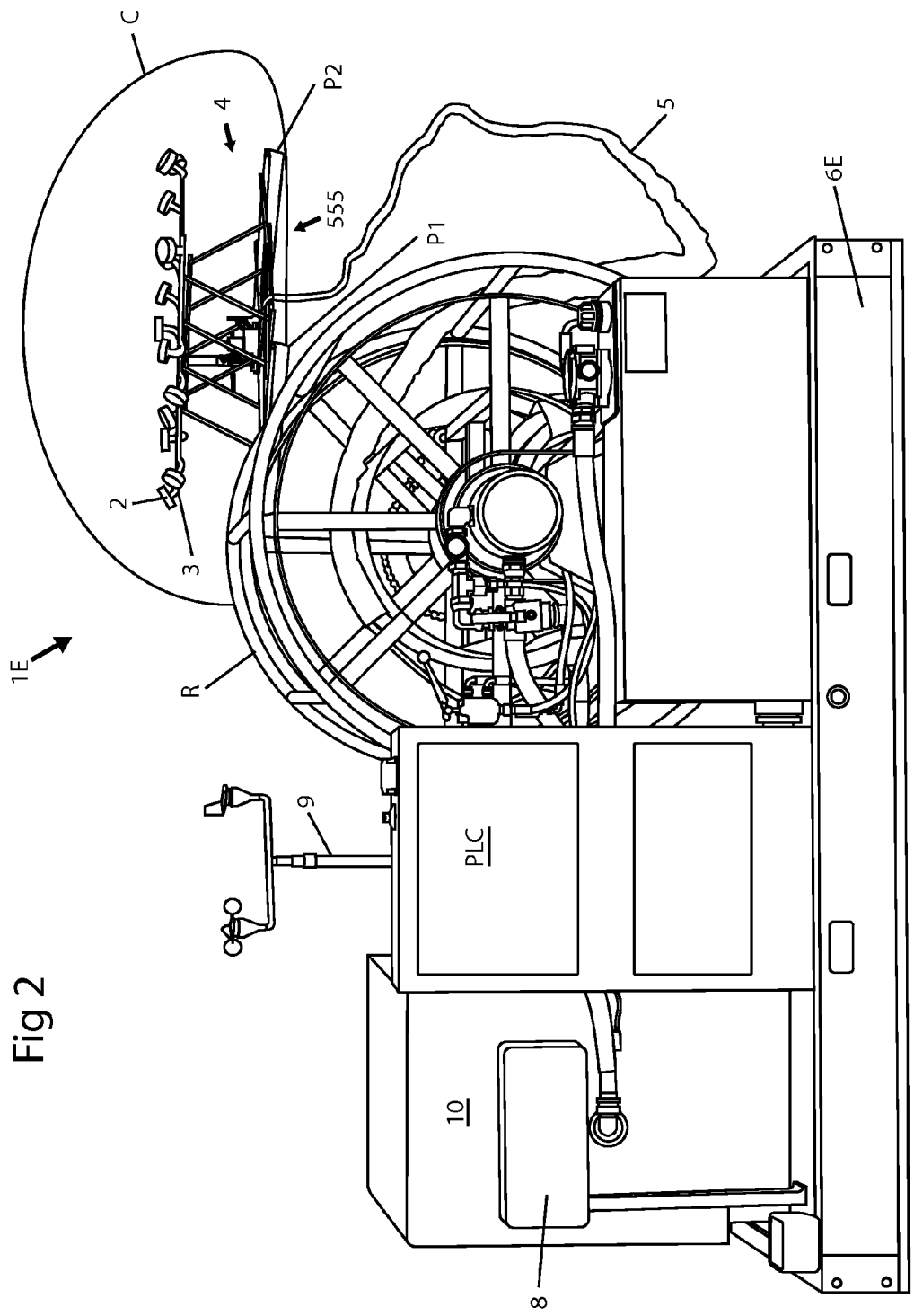
FIG. 2 is a front perspective view of the electric/hydraulic power plant and the remote watercraft.
Figure 3:
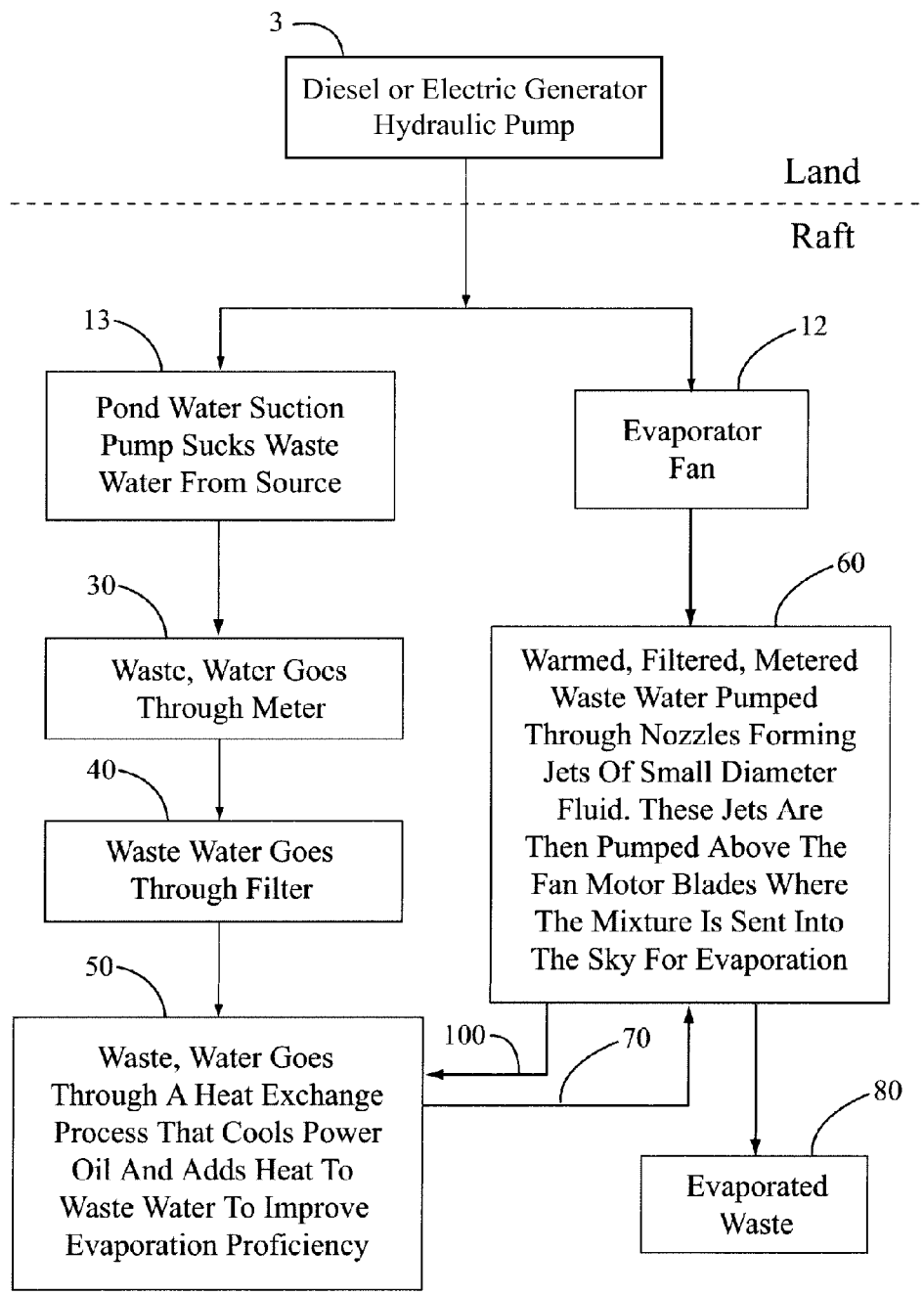
FIG. 3 (prior art) is a flow chart of the operational components of the system.
Figure 4:
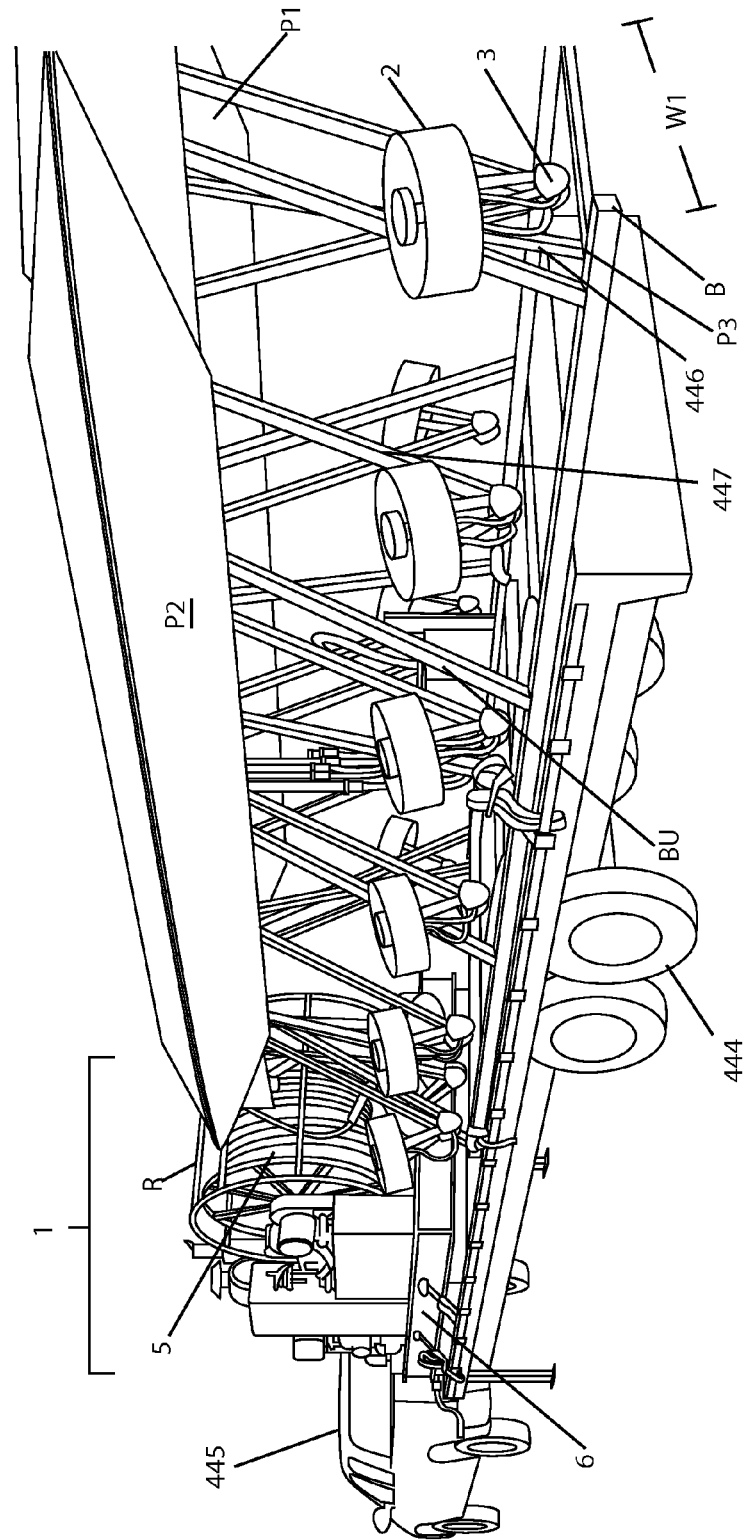
FIG. 4 is a rear perspective view of the system in transport mode.
Figure 5:
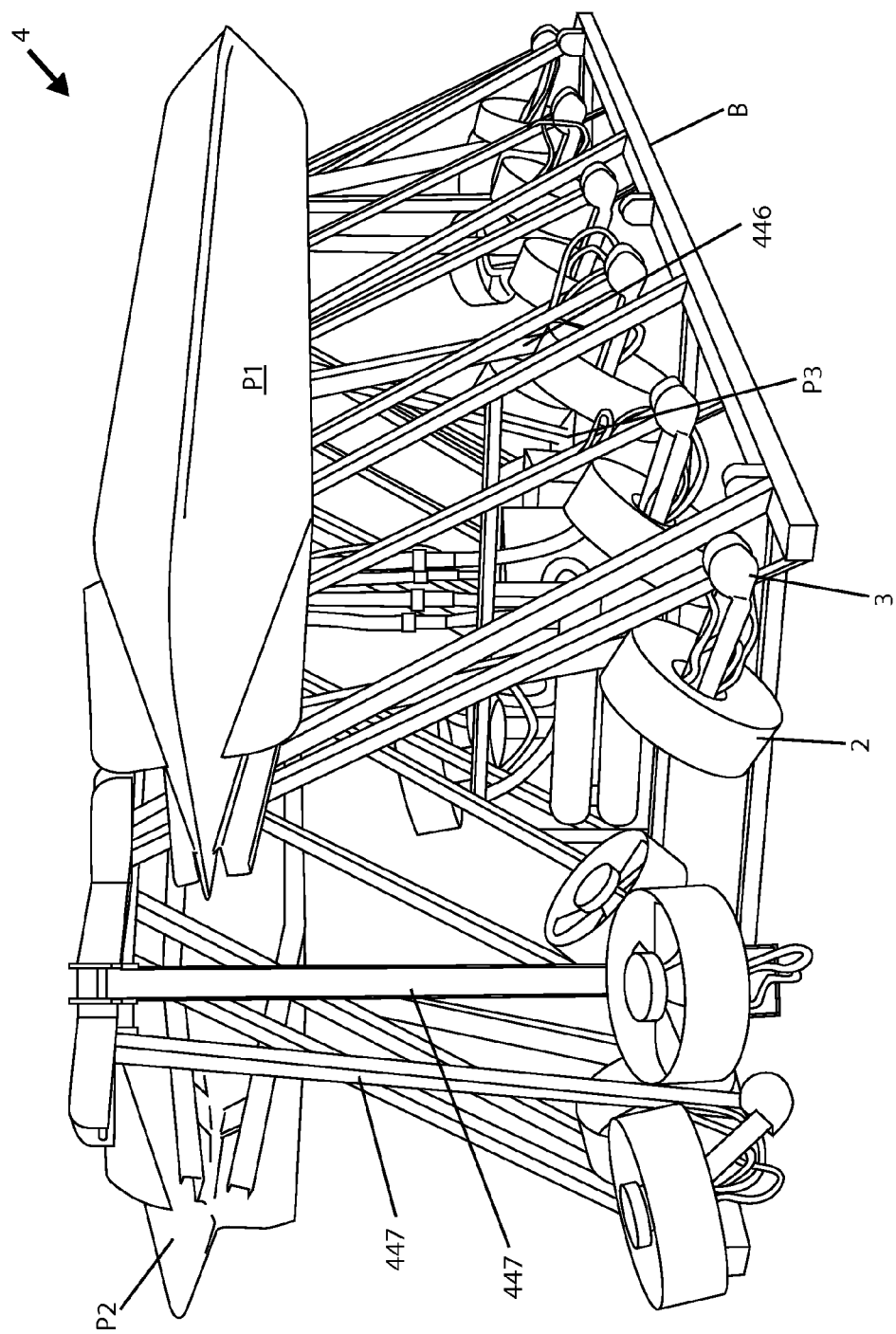
FIG. 5 is a front perspective view of the watercraft in the collapsed mode for transport.

Before explaining the disclosed embodiments in detail, it is to be understood that the embodiments are not limited in application to the details of the particular arrangements shown, since other embodiments are possible. Also, the terminology used herein is for the purpose of description and not of limitation.

DETAILED DESCRIPTION OF THE DRAWINGS

Referring first to FIG. 1 a hydraulic powered watercraft evaporative system 1 is shown forming a cone shaped evaporative cloud C. The atomizing fans 2 have a swivel support 3 which enables the fans 2 to be set at an angle from the horizontal to maximize the size of the cloud C. The watercraft 4 is a two pontoon P1, P2 design. The reel R deploys the hydraulic feed and return lines 5. The power plant 6 has a diesel engine 7 powering a hydraulic pump 8. A weather sensor 9 sends ambient weather data to a central controller PLC.

In FIG. 2 the power plant 6E replaces a diesel engine with a variable speed electric motor for the hydraulic pump 8. The electric system 1E can be run off nearby utility pole power. An alternate embodiment (not shown) uses an all electric watercraft with an electric pump and electric atomizing fans.

FIG. 3 (prior art) shows the evaporative process overview of the system 1 which is the same as U.S. Pat. No. 7,448,600 incorporated herein by reference.

The preferred power unit 7, 8 consists of a diesel powered hydraulic pump. It powers the pump P (see FIG. 12) which pulls wastewater 555 through the pump inlet assembly 13 and is filtered at 40 then through a water meter 30, then heated by the spent hydraulic fluid at 50 via pipes 100.

Next the water is sent to the evaporator fans at 60 via pipes 70. Finally, the fans evaporate the water to atmosphere at 80.

Referring next to FIG. 20 (prior art) the fan 2 is preferably a Proptec™ made by Ledebuhr Industries, Inc. www.protec-.com. It is designed as a crop sprayer. A finned pitched blade 120 rotates a high speed to generate 10,000 cubic feet per minute airflow.

A dissipater 121 ejects water out over the blade 120 as shown by arrows E. Micro droplets 14 are blown into the atmosphere.

FIG. 11 depicts the watercraft mounted heat exchanger 50. This heat exchanger pre-heats the water 555 from the pond/water reservoir of FIG. 1 before it is sent to the fans 2.

Water inlet 1300 receives water from pump P of FIG. 12. A chamber 1301 circulates the water from inlet 1300 around a pipe 1302 which is heated by spent hydraulic fluid from oil inlet 1303. This spent hydraulic fluid is drawn from the manifold 90 of FIG. 9. Hydraulic fluid exit port 1304 returns to the manifold 90. Heated water exit port 1305 supplies the pond water to the fans 2.

Referring next to FIG. 12 a retractable pump inlet assembly 1200 has a mounting bracket B that can be completely retracted into the watercraft and secured via bolt holes H. In operation the depth of the assembly 1200 can be adjusted using bolt holes H with an onboard bolt (not shown). Arrows up U and down D show the movement of the assembly 1200. Hydraulic power line 810 powers pump P, and return line 811 returns spent hydraulic fluid. The wastewater outlet 812 supplies a wastewater manifold 1201 of FIG. 9.

Referring next to FIGS. 4, 5 the system 1 is shown in transport mode. A truck 445 pulls a trailer 444. The power plant 6 is heavy and mounts at the front of the trailer 444. The watercraft 4 has a base B that supports a plurality of pontoon support arms 446 that pivot at point P3 to raise the pontoons P1, P2 up to the transport mode as shown. In this configuration the width W of the watercraft is equal to or less than nine feet to be legal on the trailer. The atomizing fans 2 are each supported by a pivot support arm 447 which is shown folded down for transport. Each of the atomizing fans 2 has a hinged base 3 to allow an adjustment of the angle of each atomizing fan 2 relative to the horizontal plane.

Referring next to FIG. 6 a schematic of a land based evaporative system 4L is shown. The base B is suited to load onto a truck and then be dropped next to a body of wastewater to be evaporated. Not shown is the simple modification of the pump P of FIG. 12 with a hose running to the body of water to be evaporated and the retractable assembly removed. The evaporative system 4L can be built in any of the hydraulic and/or electric embodiments disclosed in FIGS. 1, 2, 8, 10, 11, 13, 14, 15, 16, 17, 18, 19, 20. The power plant 6 of FIG. 1 or 6E of FIG. 2 could either be separate from the evaporative system 4L or built integral on the same frame. An all electric fan embodiment would preferably house all power and control components integral to the evaporative system 4L.

Figure 6:
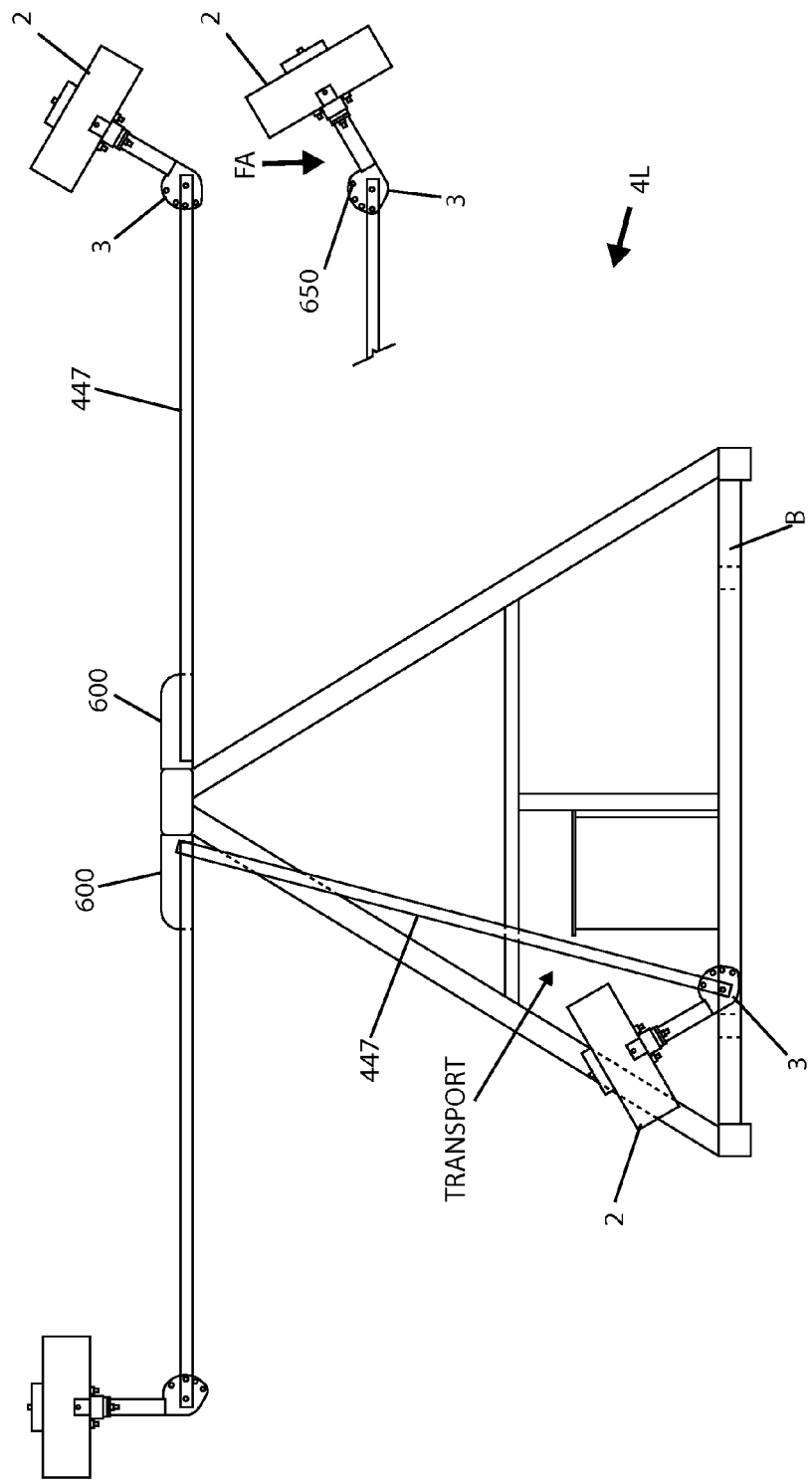
FIG. 6 is a front elevation view of a land based frame system shown schematically with the optional fan support arms shown deployed and collapsed.

In FIG. 6 the optional hinge 600 allows the fan support arm 447 to fold down for transport as shown by arrow transport. The holes 650 allow a bolt (not shown) to secure the fan 2 at a desired angle FA from the horizontal. Upper frame struts BU support the fan support arms 447.

Figure 7:
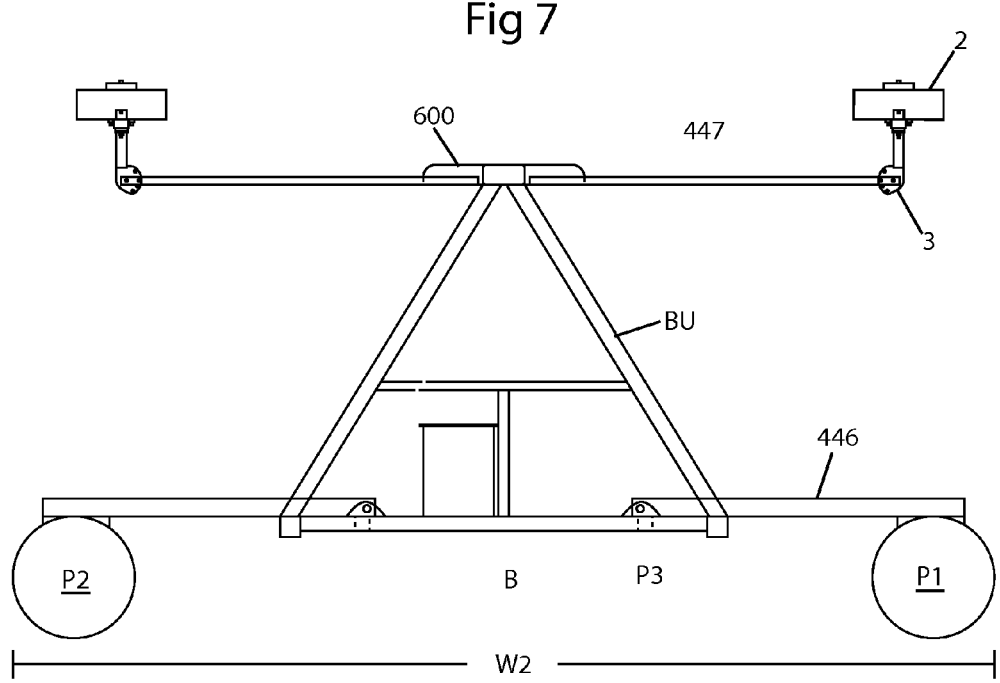
FIG. 7 is a front elevation view of the watercraft shown schematically with the pontoon supports shown deployed and the fan support arms deployed.

In FIG. 7 the watercraft 4 is fully deployed. Fan support arms 447 are up, and pontoon support arms 446 are down, W2=fourteen feet.

Figure 8:
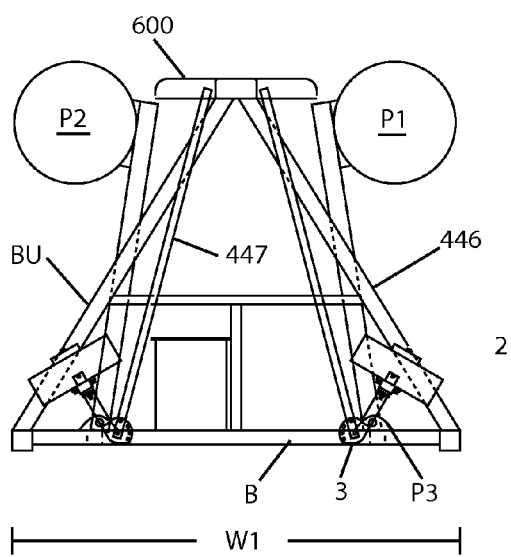
FIG. 8 is the same view as FIG. 7 with the fan supports arms collapsed and the pontoon support arms collapsed.

In FIG. 8 the watercraft 4 is ready for transport. The fan support arms 447 are down. The pontoon support arms 446 are up. W1=nine feet or less.

Figure 9:
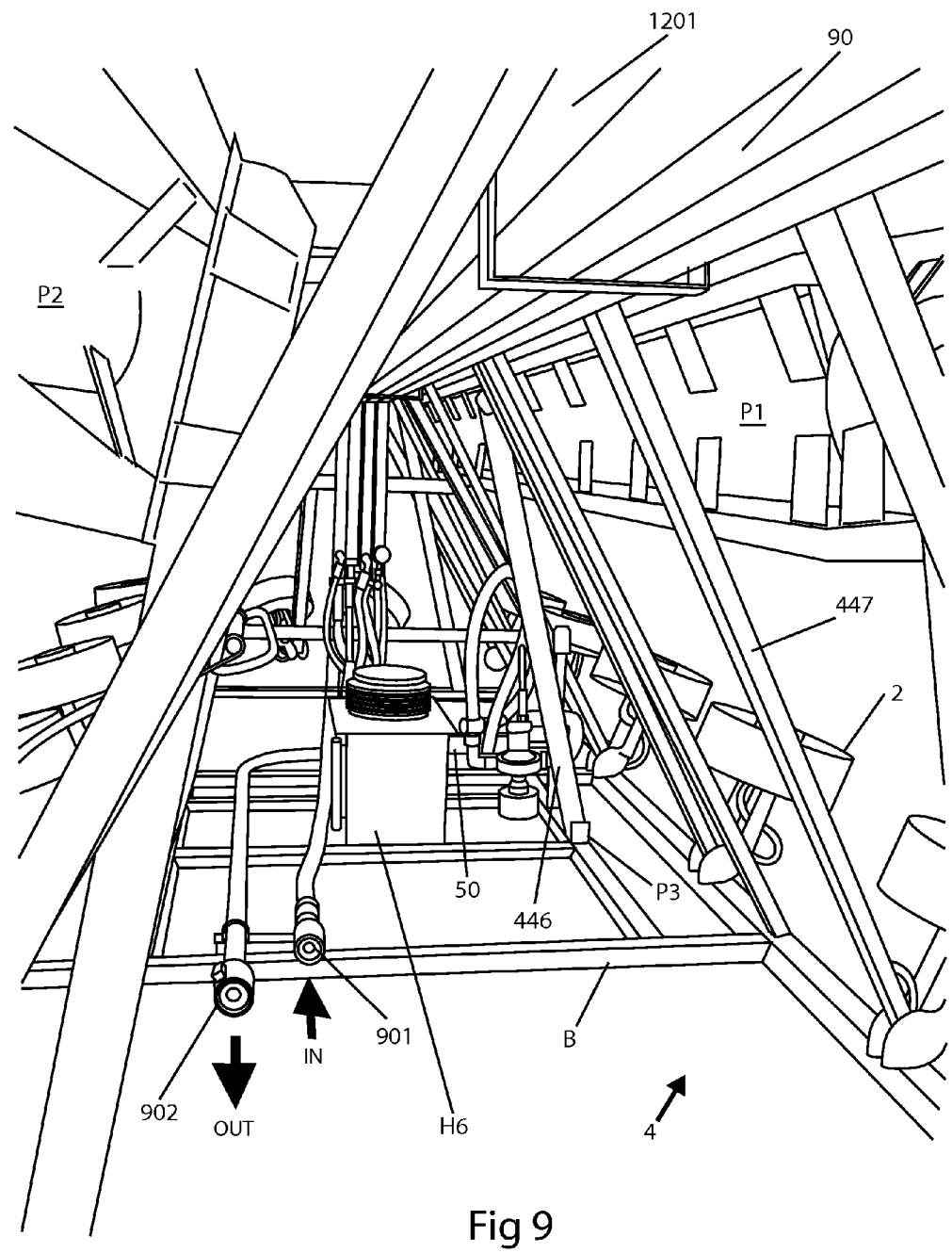
FIG. 9 is a front perspective view inside a collapsed mode watercraft.

In FIG. 9 the watercraft is in the transport mode. The onboard hydraulic scavenger tank 930 collects the fan return hydraulic fluid which prevents damaging back pressure to the fan motors. Hydraulic fluid inlet 901 feeds manifold 90 which feeds the fans 2 and pump P. Hydraulic heat exchanger 50 transfer heat to the water 555 and then passes the hydraulic fluid to outlet 902.

Figure 10:
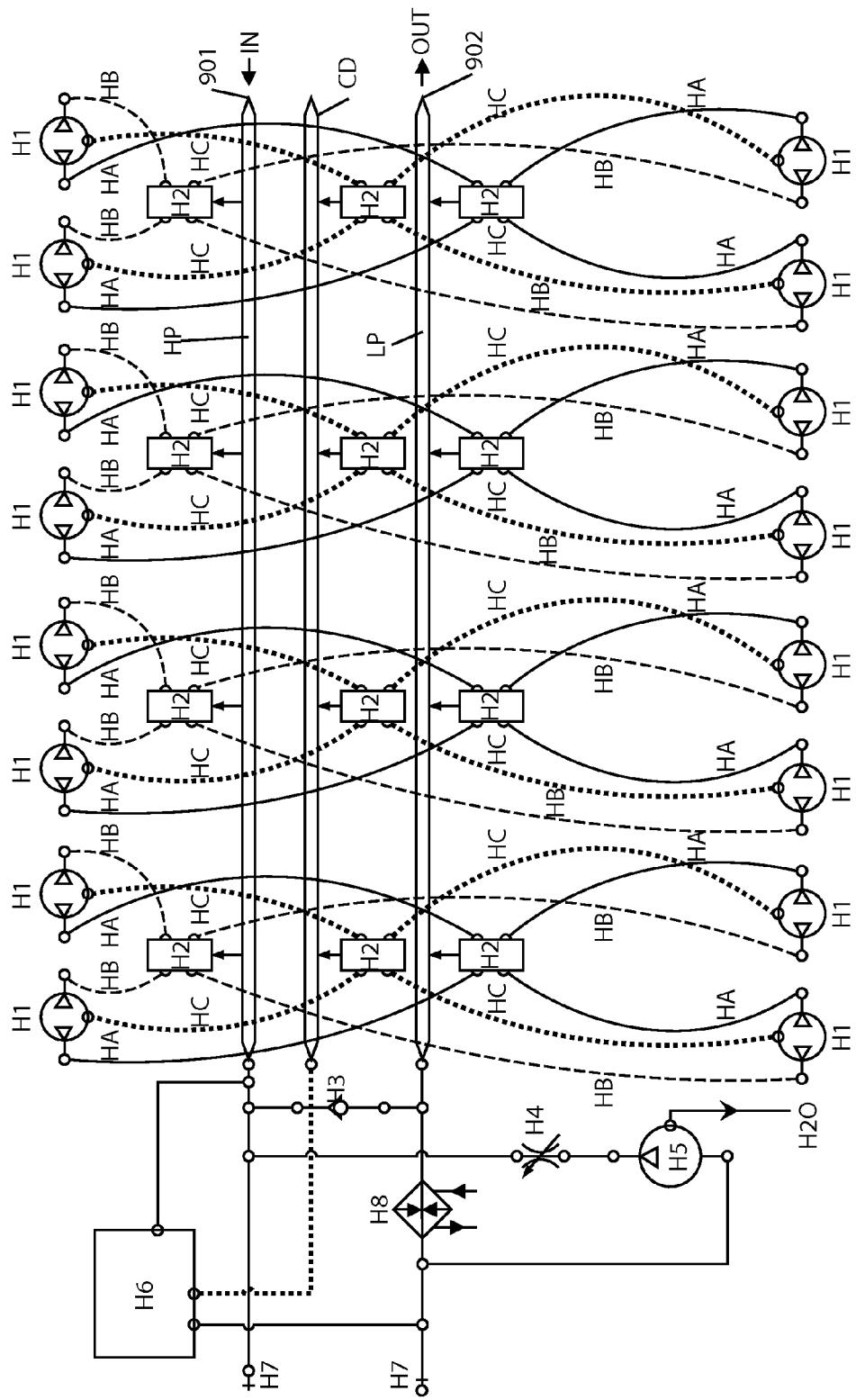
FIG. 10 is a hydraulic schematic of a sixteen fan watercraft.
Figure 11:
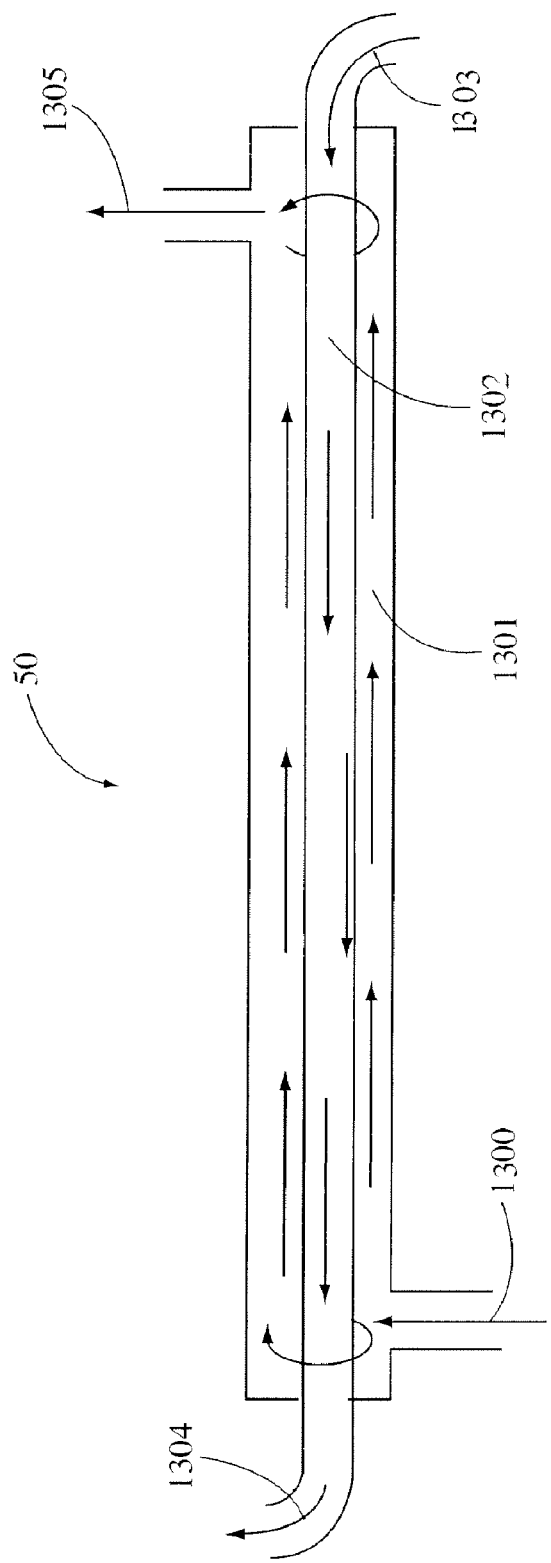
FIG. 11 (prior art) is a schematic view of the watercraft mounted heat exchanger for the spent hydraulic fluid.

Referring next to FIG. 10, the traditional piping for a hydraulic fan system is shown. The case drain pipe CD is stainless steel at 1.5 inch diameter. The high pressure pipe HP, and the low pressure pipe LP are also 1.5 inch stainless steel. A bill of materials follows below:

| Components # | Component | MFG | Model |
|---|---|---|---|
| H1 | Atomizer Hyd. Motor | Marzocchi | ALM1A-R-4-V-RA-E1-P484 |
| H2 | Aluminum junction block | Machine shop | custom |
| H3 | Check Valve | Donaldson | P562317 |
| H4 | Water Pump flow control w/DIN connector | Comatrol Beldon/Hirschman | PSV10-NC-40-12D-DN-B-8695027-933 |
| H5 | Hyd. Water pump | Hypro | 9303S-HM1C |
| H6 | Scavenger Tank | Custom | Custom |
| H7 | 1.5" wing coupler | Dixon | WS12 |
| H8 | Heat Exchangers | AIC | B1000 |
| HA | ⅜" Pressure hose | Dayco | 011456 |
| HB | ⅜" Return hose | Dayco | 011456 |
| HC | ¼" Case drain hose | Dayco | 011454 |

Figure 13:
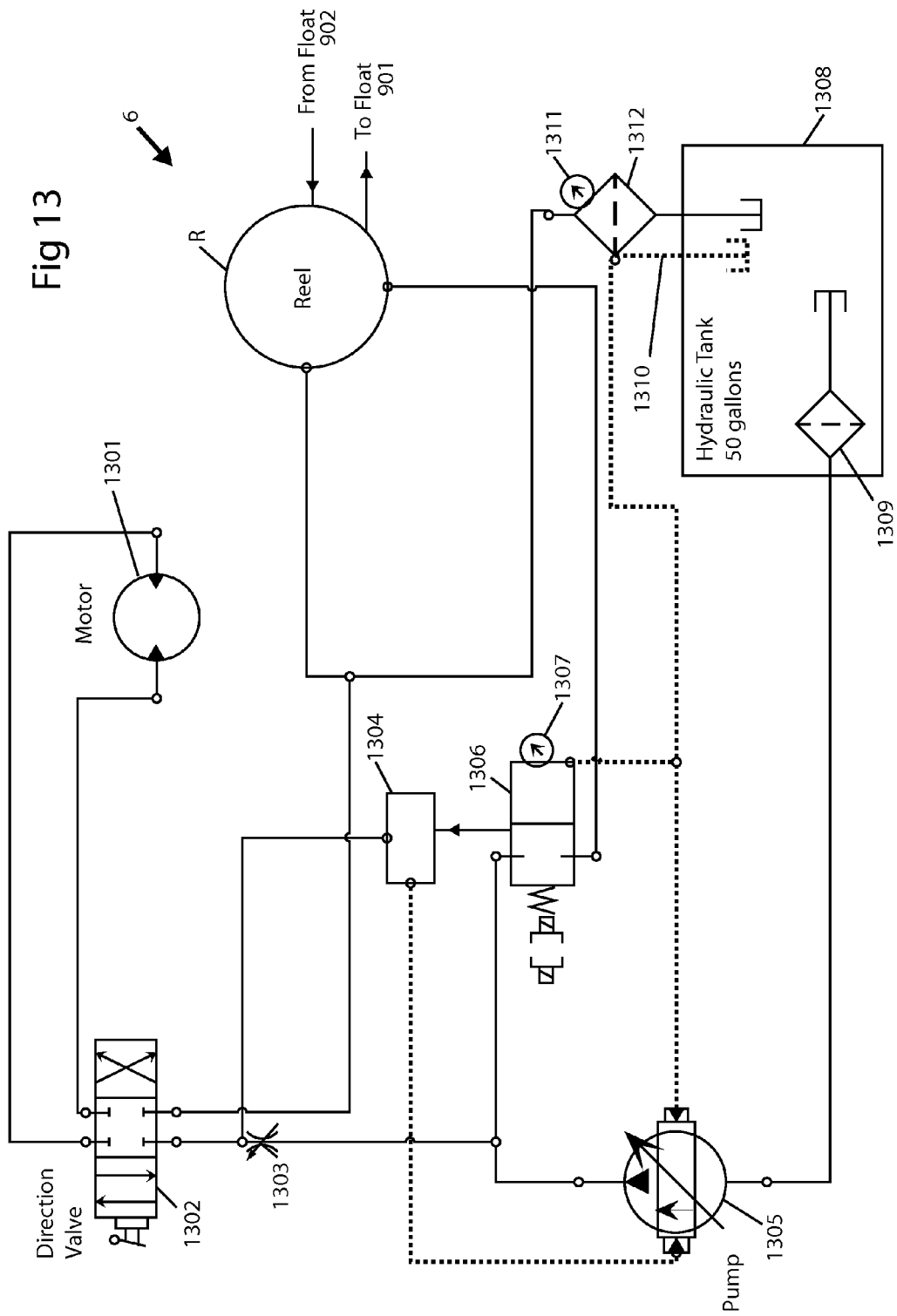
FIG. 13 is a hydraulic schematic of the entire system.

Referring next to FIG. 13 the power plant 6 is shown schematically. The reel R is controlled by hydraulic reel motor 1301 having a directional valve 1302. A hydraulic flow control 1303 prevents over pressure to the reel. A butterfly valve 1304 allows hydraulic pressure to be diverted to the reel without opening the soft start manifold 1306. All hydraulic pressure is generated by a load sending piston pump 1305 which feeds a soft (fan) start manifold 1306 having a high pressure gauge 1307. The hydraulic 50 gallon tank 1308 has a suction filter 1309, a case drain return 1310, a return pressure gauge 1311 and a return filter 1312.

Figure 14:
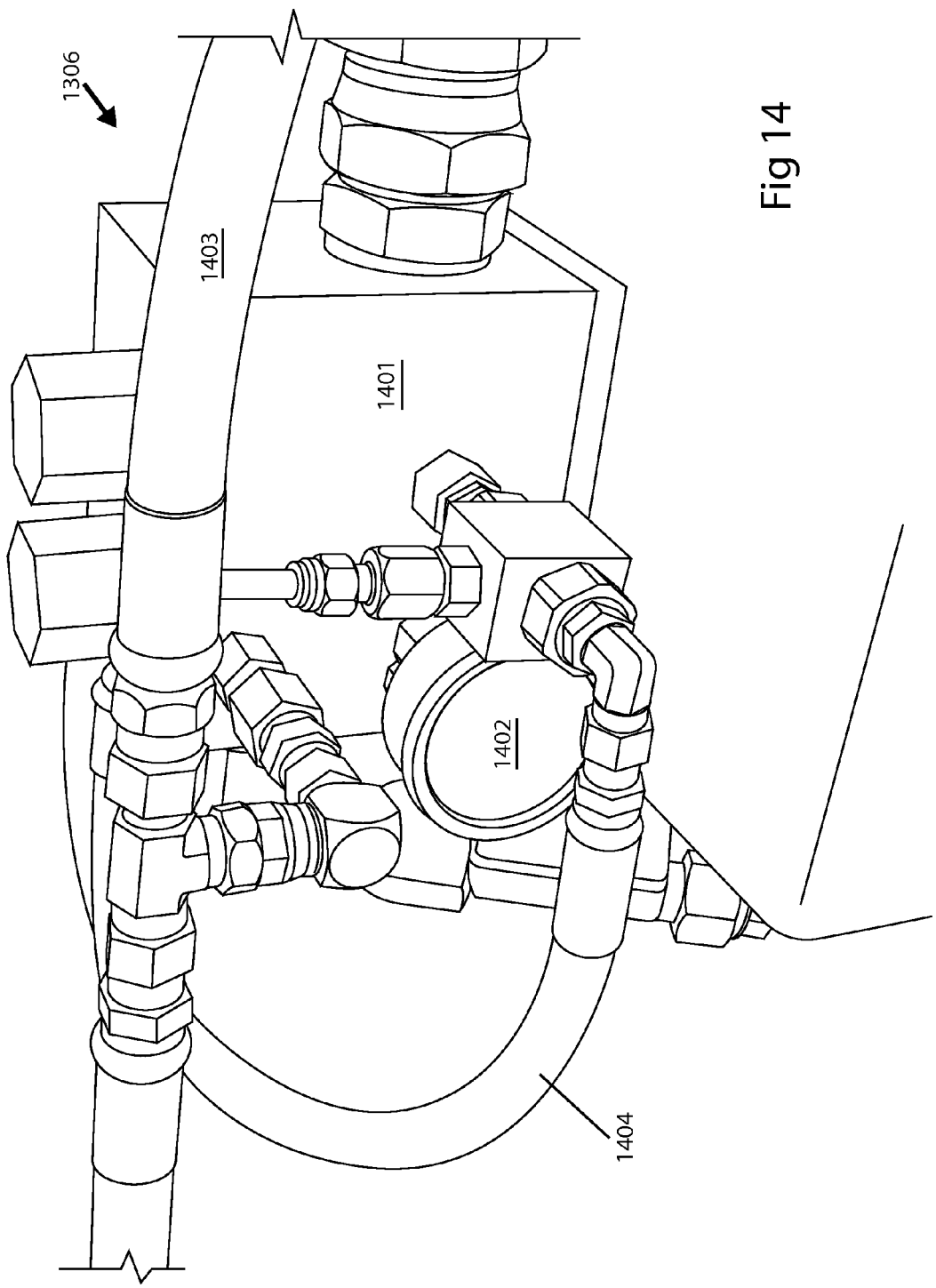
FIG. 14 is a front perspective view of a hydraulic proportional valve slow opening fan starting device.

Referring next to FIG. 14 the soft start manifold 1306 has a slow opening proportional valve 1401, a gauge 1402, a high pressure inlet 1403, and a regulated pressure outlet 1404.

Figure 12:
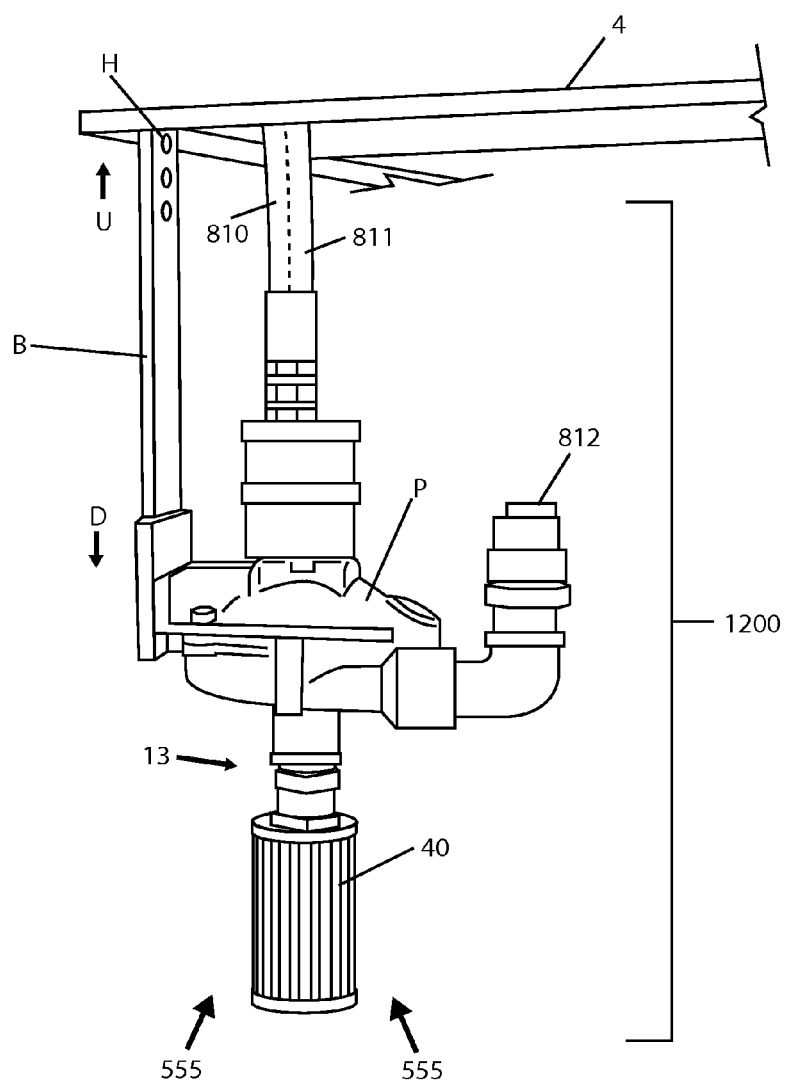
FIG. 12 is a top perspective view of the best mode pump inlet assembly.
Figure 15:
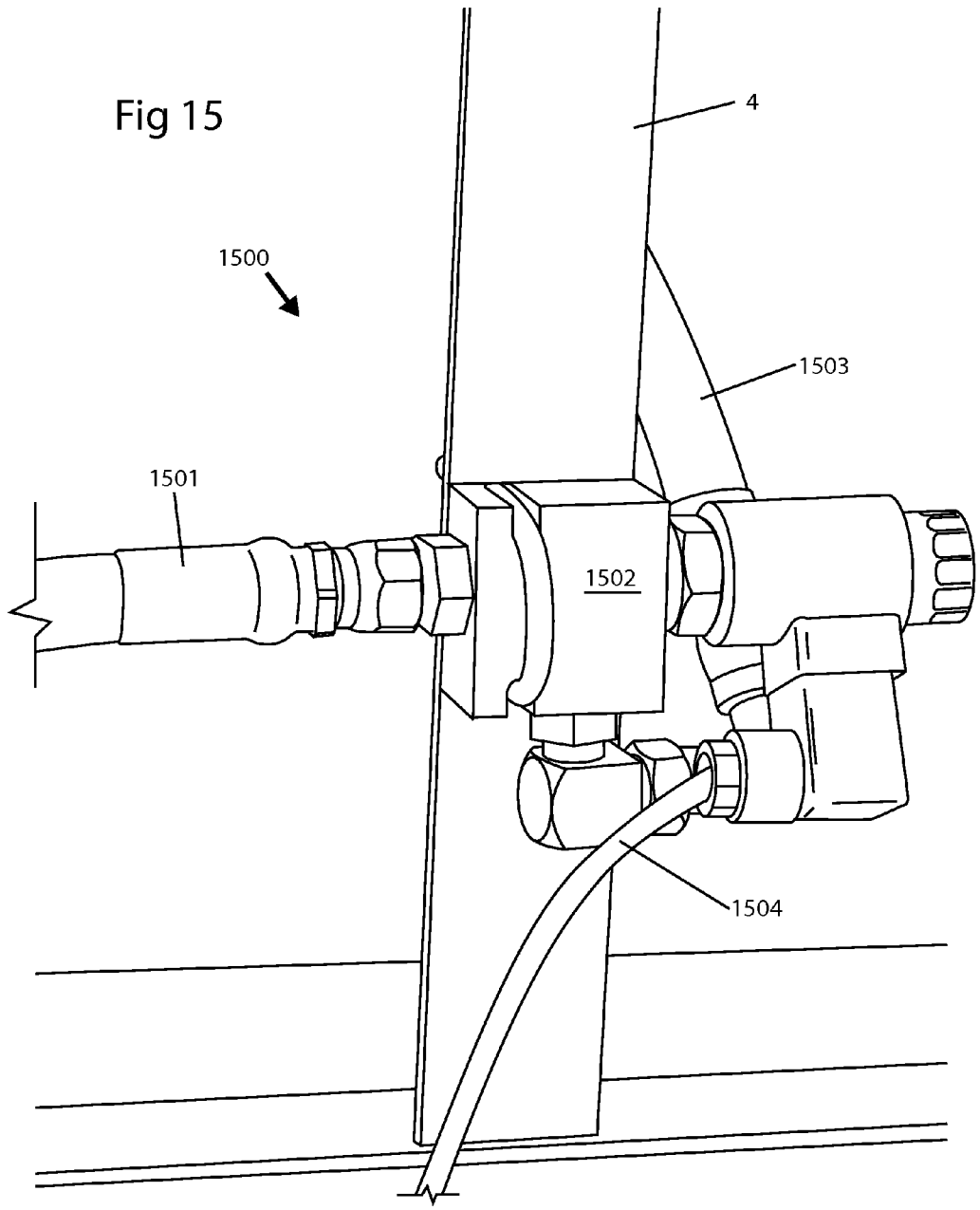
FIG. 15 is a closed loop pump speed hydraulic regulating valve.
Figure 16:
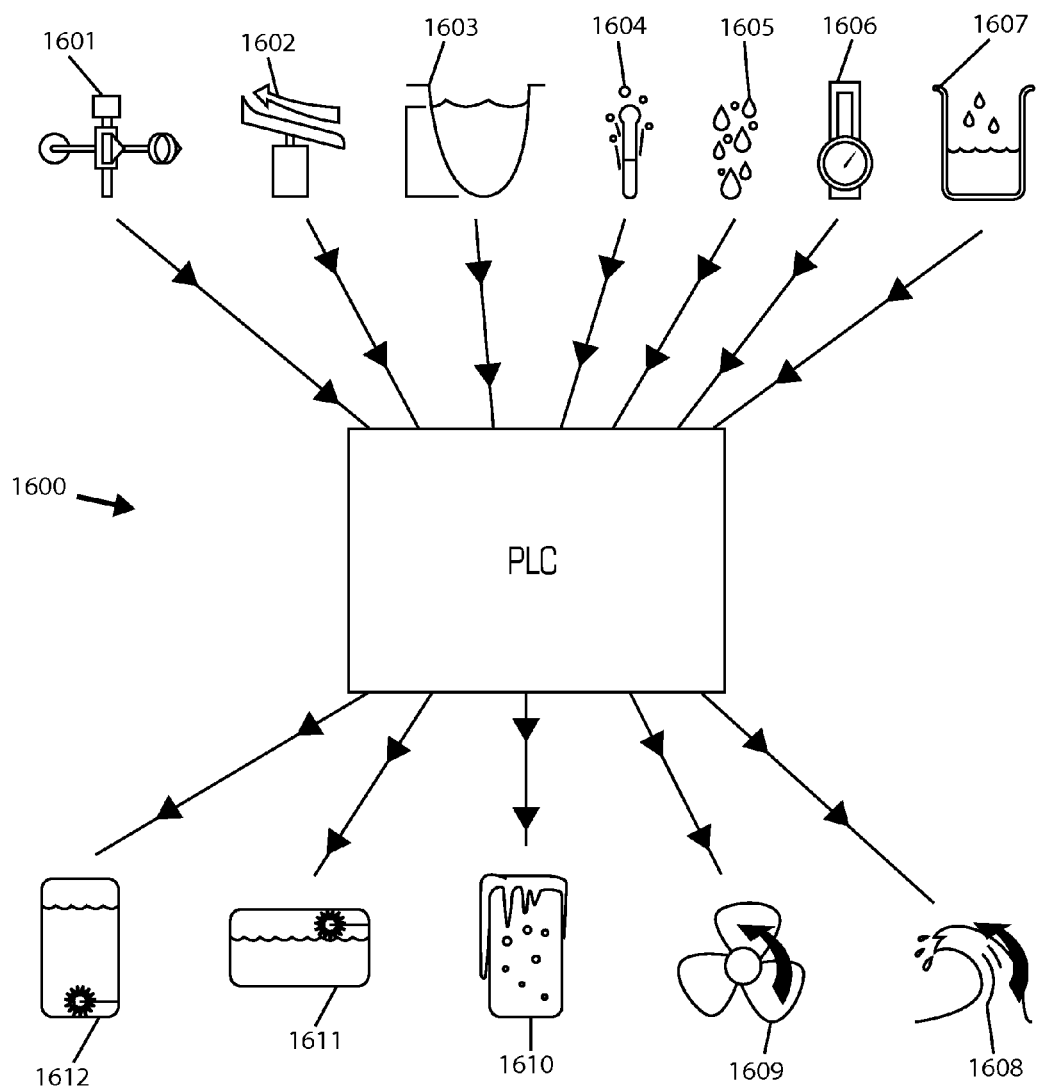
FIG. 16 is a schematic of the central controller inputs and outputs.
Figure 17:
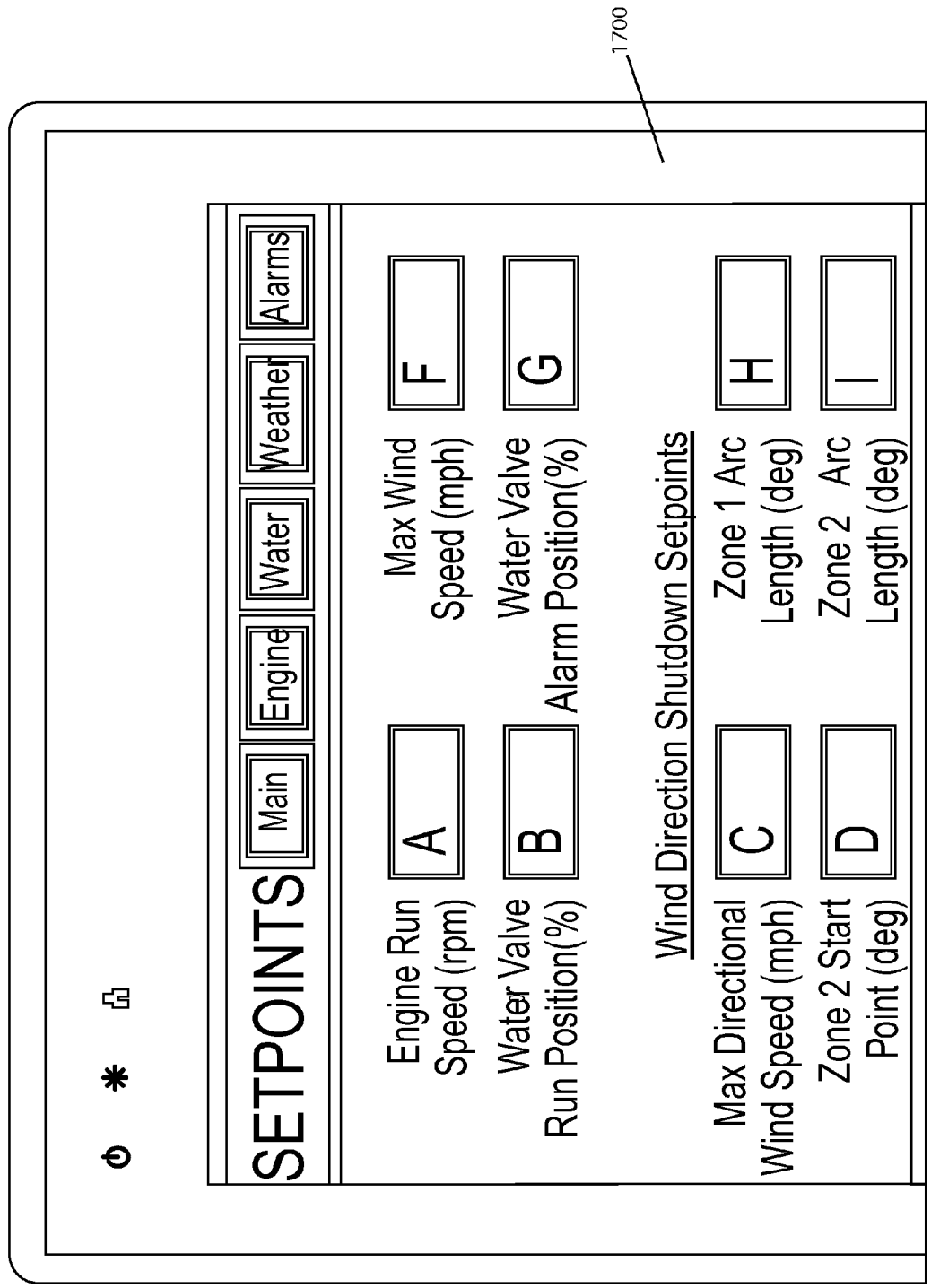
FIG. 17 is a front elevation view of the weather set point input screen.
Figure 18:
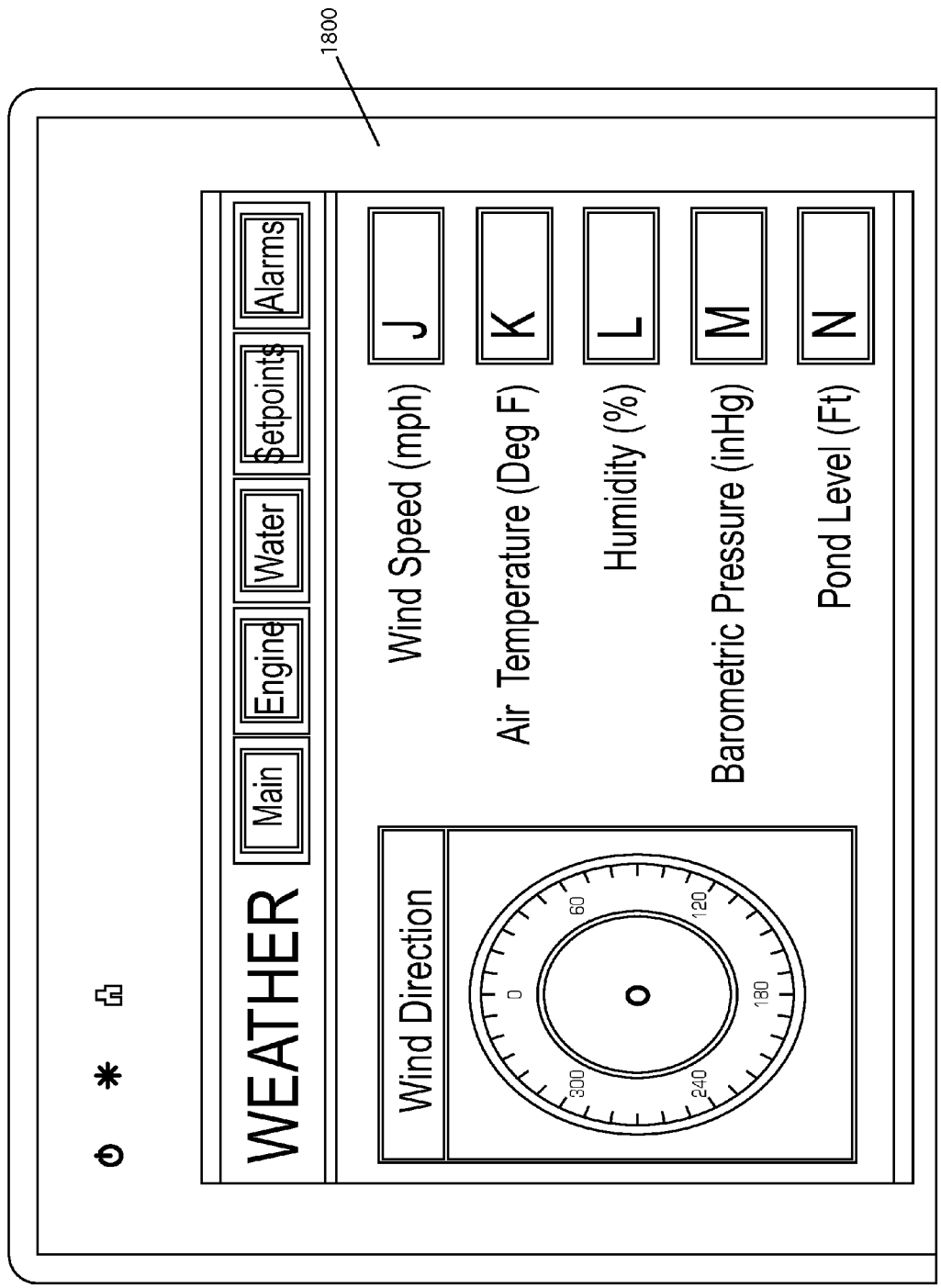
FIG. 18 is a front elevation view of the weather and wind direction arc input screen.
Figure 19:
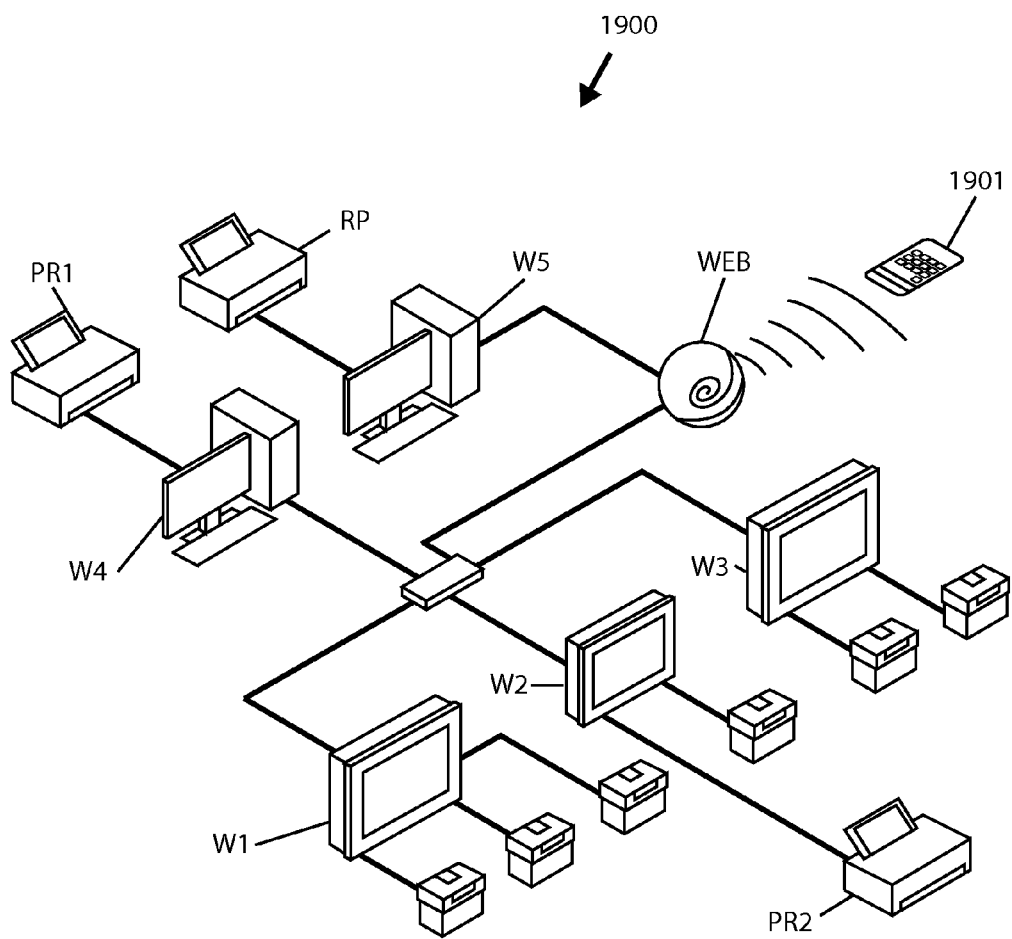
FIG. 19 is a schematic of a multi watercraft central control layout.
Figure 20:
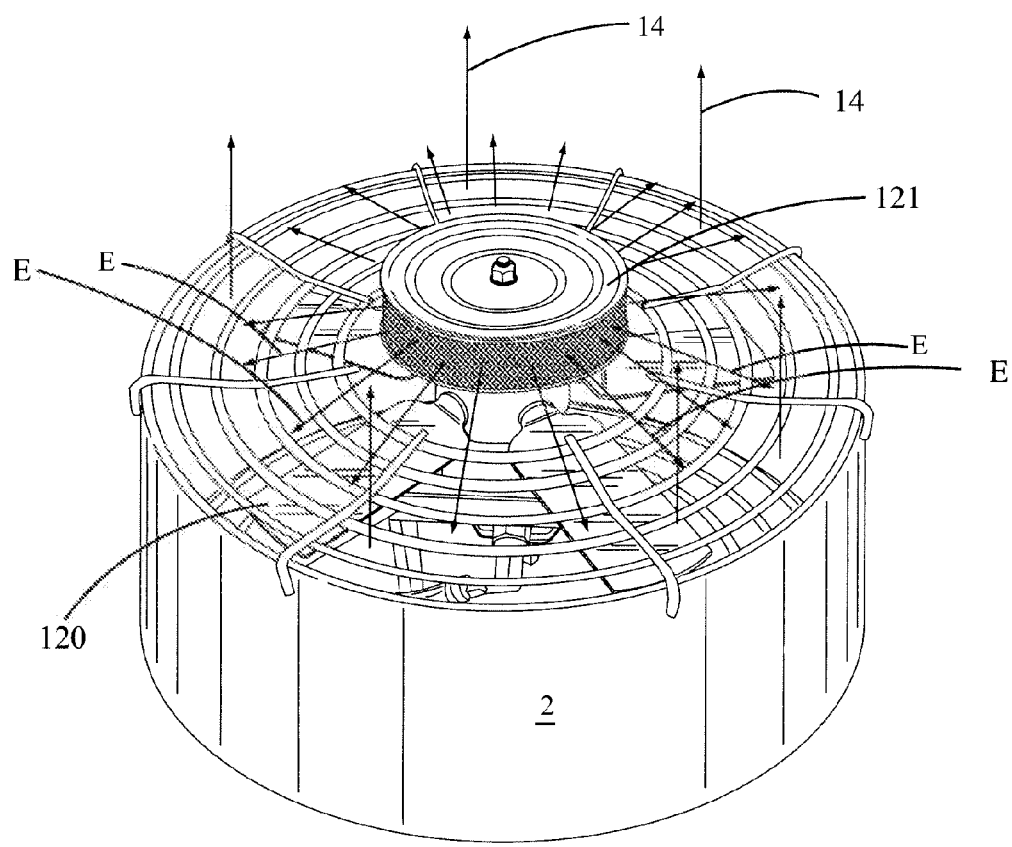
FIG. 20 (prior art) is a top perspective view of an atomizing fan.

Referring next to FIG. 15 the water pump P shown in FIG. 12 has a speed regulator 1500 comprising a high pressure inlet 1501, a proportional valve 1502, an outlet to the pump 1503, and an input control line 1504 to regulate the pump speed via an electric signal from the controller PLC in FIG. 16 which provides control of the water flow.

Referring next to FIG. 16 a schematic of the control system 1600 is shown. A central program logic controller PLC is shown. Inputs include wind speed 1601, wind direction 1602, pond depth 1603, pH 1604, humidity 1605, output hydraulic pressure to the watercraft 1606, rain accumulation 1607, evaporative flow rate 1608, atomizing fan speed 1609 (which dictates droplet size), air temperature 1601, hydraulic tank 1308 level alarm 1611, and scavenger tank H6 level alarm 1612.

The preferred embodiment provides a user programmable central control algorithm. This central control algorithm can receive weather data including wind direction and speed, air temperature, humidity and total evaporative flow rate. The algorithm can be programmed as desired. For example if the atomizing fans are near an employee housing unit, then the arc of wind direction of the employee housing unit could be entered into an input device. A setpoint of wind speed in that arc direction could be set at five miles per hour or greater. Therefore, the central control algorithm would shutdown the system when the wind speed reached five miles per hour in the direction of the employee housing unit. Other examples include reducing the evaporative flow rate in selected arc direction by slowing the pump P down and/or reducing the speed of the atomizing fans. Other examples include providing system shutdown for high humidity or low temperature or low evaporative rate. System dynamics such as low hydraulic pressure can be programmed to shut the system down.

These systems are designed for unmanned round the clock continuous operation. The varying ambient conditions from desert to mountains require that the central control algorithm be programmable to satisfy a wide range of potential work site locations where the system could be placed. The variables of control parameters are limitless. For example a toxic pH could cause a shutdown. A GPS locator could be used to detect a dangerous drift of the watercraft. High winds and/or broken hydraulic connections could all be addressed with the central control algorithm.

Referring next to FIGS. 17, 18 setpoint input screens 1700 and 1800 are shown. The engine run speed A dictates the fan speed. The water valve from pump P run position B can be adjusted to control evaporative rate. A maximum wind speed shut off F is shown. A pump water valve alarm position G can be set. (What?) Two zones or arcs of wind direction can be set. For example zone 1 "H" could be 0-30° and zone 2 "I" could be 50-70° which would show on the wind direction meter on FIG. 18. Variables J, K, L, M, N are self explanatory as labeled on the screen in FIG. 18.

Referring next to FIG. 19 multi-watercraft central monitoring system is schematically shown. One manufacturer is Maple Graphic Systems, Inc. A remote smart phone 1901 can monitor 1 control the entire multi-location system 1900. The World Wide Web WEB is a transfer hub. Each watercraft with its own PLC is designated W1, W2, W3, W4, W5. Local printers to the watercraft are labeled PR1, PR2. A remote (central location) printer is RP. A router 1902 coordinates all data.

One supplier of a pH and waste water sensor is Mettler Toledo's model M420.

An alternate embodiment fan is an all electric atomizing fan such as a Ledebuhr Industries model PT240-02HF. The droplet size range is 100-150 microns with a flow rate of four gallons per minute. The weight with the two horsepower motor is sixty eight pounds. Not pictured is an all electric watercraft with electric cabling leading from the reel.

While a number of exemplifying features and embodiments have been discussed above, those of skill in the art will recognize certain modifications, permutations, additions and subcombinations thereof. No limitation with respect to the specific embodiments disclosed herein is intended or should be inferred.

I claim:

1. A fluid evaporator system comprising:
a watercraft having a pump to propel an evaporative fluid to an onboard heat exchanger;
said onboard heat exchanger having an evaporative fluid connection to a plurality of onboard atomizing fans;
said onboard atomizing fans each having a hydraulic actuator which expels spent hydraulic fluid to the onboard heat exchanger and then to a hydraulic power pump which provides pressure and recirculation to the hydraulic fluid;
wherein the pressurized recirculated hydraulic fluid powers the fan(s) hydraulic actuator(s);
said system further comprising a weather sensor which sends a wind signal to an algorithm of control parameters for a central controller; and
said central controller having an input device to allow a system operator to define an arc of wind direction which triggers an algorithm of control parameters for the system via the central controller.

2. The system of claim 1, wherein the weather sensor further comprises a wind speed sensor which sends a wind speed signal to the algorithm of control parameters in the central controller, and wherein the input device can receive a maximum wind speed setpoint to trigger the algorithm to control a total water evaporation by adjusting a speed of the atomizing fans or adjust a speed of the pump.

3. The system of claim 1, wherein the weather sensor further comprises a wind speed sensor which sends a wind speed signal to the algorithm of control parameters in the central controller, and wherein the input device can receive an arc of wind direction and a maximum wind speed in that arc of wind direction to trigger the algorithm to shutdown the system via the central controller.

4. The system of claim 1, wherein the weather sensor further comprises a humidity sensor which sends a humidity signal to the algorithm of control parameters in the central controller, and wherein the input device can receive a maximum humidity setpoint to trigger the algorithm to shutdown the system via the central controller.

5. The system of claim 1, wherein the weather sensor further comprises a temperature sensor which sends a temperature signal to the algorithm of control parameters in the central controller, and wherein the input device can receive a temperature setpoint to trigger the algorithm to shutdown the system via the central controller.

6. The system of claim 1, wherein the pump further comprises a flow rate sensor which sends a flow rate signal to the algorithm of control parameter in the central controller, and wherein the input device can receive a low flow rate setpoint to trigger the algorithm to shutdown the system.

7. The system of claim 1, wherein the onboard atomizing fans each have a mounting bracket which can be adjusted within a radial arc.

8. The system of claim 1, wherein the hydraulic power pump has a variable pressure controller which can reduce the hydraulic pressure which reduces the atomizing fan speed which increases a droplet size output.

9. The system of claim 1, wherein the watercraft further comprises a collapsible frame having a deployed configuration of a pair of pontoons spaced at least about thirteen feet apart and having a folded configuration of the pair of pontoons less than about nine feet apart for transport on a trailer.

10. The system of claim 9, wherein the collapsible frame further comprises a fold down mounting arm for an atomizing fan having a deployed configuration supporting the atomizing fan in the air and a folded configuration supporting the atomizing fan down on a base of the watercraft for transport on a trailer.

11. The system of claim 1, wherein the watercraft further comprises an onboard hydraulic fluid reservoir.

12. An evaporator system comprising:
a watercraft having a pump to propel a fluid from a body or fluid which floats the watercraft to a plurality of onboard atomizing fans;
said atomizing fans powered by a hydraulic actuator which expels spent hydraulic fluid to a land based hydraulic power pump;
wherein the land based hydraulic power pump pressurizes and recirculates the spent hydraulic fluid;
said watercraft having a base with a left and a right hinged arm support; each hinged arm support supporting a pontoon having a deployed left pontoon to right pontoon width of at least about twelve feet, and having a folded up transport left pontoon to right pontoon width of less than or equal to about nine feet.

13. The system of claim 12, wherein the base further comprises a support assembly for an atomizing fan, said support assembly have a collapsible fan support arm that pivots from a folded mode placing the atomizing fan down near the base and pivots up to a deployed mode supporting the atomizing fan in the air.

14. The system of claim 13, further comprising a control system with a weather sensor to send a wind speed and direction signal to the control system, wherein an operator can designate a maximum wind speed in a wind direction arc to trigger a system algorithm to shutdown the system or control an evaporative water volume by means of slowing the pump speed and/or slowing the fan speed.

15. An evaporator system comprising:
a watercraft having a pump to propel a fluid from a body or fluid which floats the watercraft to a plurality of onboard atomizing fans;
said atomizing fans each powered by an electric motor;
wherein a land based electric power skid sends power to the atomizing fans and the pump;
said watercraft having a base with a left and a right hinged arm support; each hinged arm support supporting a pontoon having a deployed left pontoon to right pontoon width of at least about twelve feet, and having a folded up transport left pontoon to right pontoon width of less than or equal to about nine feet.

16. The system of claim 15, wherein the base further comprises a support assembly for an atomizing fan, said support assembly have a collapsible fan support arm that pivots from a folded mode placing the atomizing fan down near the base and pivots up to a deployed mode supporting the atomizing fan in the air.

17. The system of claim 15, further comprising a control system with a weather sensor to send a wind speed and direction signal to the control system, wherein an operator can designate a maximum wind speed in a wind direction arc to trigger a system shutdown or control an evaporative water flow.

18. The system of claim 17, wherein the control system can vary the speed of the atomizing fans to create various size water droplets.

19. The system of claim 17, wherein the control system can vary the speed of the pump.

20. A fluid evaporator system comprising:
- a frame having a pump to propel an evaporative fluid to an onboard heat exchanger;
- said onboard heat exchanger having an evaporative fluid connection to a plurality of onboard atomizing fans;
- said onboard atomizing fans each having a hydraulic actuator which expels spent hydraulic fluid to the onboard heat exchanger and then to a hydraulic power pump which provides pressure and recirulation to the hydraulic fluid;
- wherein the pressurized recirculated hydraulic fluid powers the fan (s) hydraulic actuator (s);
- said system further comprising a weather sensor which sends a wind signal to an algorithm of control parameters for a central controller; and
- said central controller having an input device to allow a system operator to define an arc of wind direction which triggers an algorithm of control parameters for the system via the central controller.

21. The system of claim 20, wherein the weather sensor further comprises a wind speed sensor which sends a wind speed signal to the algorithm of control parameters in the central controller, and wherein the input device can receive a maximum wind speed setpoint to trigger the algorithm to control a total water evaporization by adjusting a speed of the atomizing fans or adjust a speed of the pump.

22. The system of claim 20, wherein the weather sensor further comprises a wind speed sensor which sends a wind speed signal to the algorithm of control parameters in the central controller, and wherein the input device can receive an arc of wind direction and a maximum wind speed in that arc of wind direction to trigger the algorithm to shutdown the system via the central controller.

23. A fluid evaporator system comprising:
- a frame having a pump to propel an evaporative fluid to a plurality of onboard electric powered atomizing fans;
- said system further comprising a weather sensor which sends a wind signal to an algorithm of control parameters for a central controller; and
- said central controller having an input device to allow a system operator to define an arc of wind direction which triggers an algorithm of control parameters for the system via the central controller.

24. The system of claim 23, wherein the weather sensor further comprises a wind speed sensor which sends a wind speed signal to the algorithm of control parameters in the central controller, and wherein the input device can receive a maximum wind speed setpoint to trigger the algorithm to control a total water evaporization by adjusting a speed of the atomizing fans or adjust a speed of the pump.

25. The system of claim 23, wherein the weather sensor further comprises a wind speed sensor which sends a wind speed signal to the algorithm of control parameters in the central controller, and wherein the input device can receive an arc of wind direction and a maximum wind speed in that arc of wind direction to trigger the algorithm to shutdown the system via the central controller.

* * * * *